United States Patent [19]

Pollack

[11] 4,390,978
[45] Jun. 28, 1983

[54] CARRIAGE TRANSLATING MECHANISM FOR VIDEO DISC PLAYER

[75] Inventor: Jeremy D. Pollack, Kingston, N.J.

[73] Assignee: RCA Corporation, New York, N.Y.

[21] Appl. No.: 279,183

[22] Filed: Jun. 30, 1981

[51] Int. Cl.³ .................. G11B 21/08; G11B 3/36
[52] U.S. Cl. .................. 369/220; 33/444; 369/77; 369/249
[58] Field of Search ......... 369/77, 219, 220, 221, 369/249; 353/27 R; 33/444

[56] References Cited

U.S. PATENT DOCUMENTS

| | | | |
|---|---|---|---|
| 3,016,615 | 1/1962 | Falconer | 33/444 |
| 3,870,320 | 3/1975 | Torrington | 369/220 |
| 3,870,835 | 3/1975 | Stave | 369/223 |
| 3,993,316 | 11/1976 | Fairbanks | 369/220 |
| 4,118,039 | 10/1978 | Kurata et al. | 369/219 |
| 4,191,380 | 3/1980 | Allen et al. | 369/77.2 |
| 4,196,906 | 4/1980 | Torrington | 369/77 |
| 4,216,969 | 8/1980 | Allen | 369/77 |

FOREIGN PATENT DOCUMENTS 54-142011  11/1979  Japan ................ 369/219

*Primary Examiner*—Steven L. Stephan
*Attorney, Agent, or Firm*—E. M. Whitacre; J. S. Tripoli; D. A. Kulkarni

[57] ABSTRACT

A pickup carriage drive for a video disc player comprises a selective-activated motor mounted on a pickup carriage. A drive cord is strung between a pair of anchor points disposed in the player, and has a portion wrapped around the output shaft coupled to the drive motor. The motor, when energized, drives the carriage to follow the pickup stylus across the record during playback.

5 Claims, 6 Drawing Figures

CARRIAGE TRANSLATING MECHANISM FOR VIDEO DISC PLAYER

This invention relates to a video disc player, and more particularly, it concerns a carriage drive mechanism for a video disc player.

In certain systems, picture and sound signals are stored on a disc record in the form of physical undulations in a continuous spiral track disposed on the record surface. The variations in electrical capacitance between an electrode defined by a record-engaging stylus and a conductive property of the record are sensed as the physical undulations on the record surface pass beneath the stylus tip. The capacitive variations are converted into electrical signals suitable for application to a conventional television receiver. A capacitance-type pickup system is illustratively disclosed in U.S. Pat. No. 3,842,194 (Clemens).

Typically, a video disc record is housed in a protective caddy which comprises an outer jacket and a record retaining spine. The spine is provided with an opening in which a record is received, thereby forming a record/spine assembly. To load a record into a player, a full caddy is inserted into the player along a pair of guide rails provided in the player. A record extraction mechanism disposed in the player removes the record/spine assembly from the jacket for retention in the player on a set of receiving pads during subsequent jacket withdrawal. To transfer the record to the turntable for playback, the turntable is raised relative to the receiving pads. The player is provided with hold-down members which hold the spine in place while allowing the record to be picked up by the turntable when it is raised. During playback, the pickup stylus is traversed radially across the record while the turntable revolves the record at the desired speed (e.g., 450 rpm). For record retrieval, the record is transferred back to the receiving pads by lowering the turntable with respect to the receiving pads to redefine the record/spine assembly. An empty jacket is then reinserted into the player, whereby the record/spine assembly is retrieved into the jacket.

The pickup stylus is, typically, disposed at one end of a stylus arm having the other end secured to a protective cartridge by means of a flexible coupler. The flexible coupler allows the stylus to follow the vertical and horizontal movements of the record surface (e.g., warp, eccentricity, etc.). The pickup cartridge is mounted in a carriage having an opening in the bottom wall thereof through which the pickup stylus protrudes for record engagement when lowered. During playback, the carriage is translated from a starting position at the back of the player toward the record center so as to follow the radially inward motion of the stylus.

The carriage is reset to the starting position during a caddy insertion. As an empty caddy is inserted into the player for record retrieval, the front edge thereof engages the carriage to drive it back to a preset limit stop defining the starting position.

In accordance with the present invention, a mechanism is provided for translating the carriage. The subject mechanism consists of a selectively-energized motor mounted to the carriage. A drive cord, having a portion wrapped about an output shaft, coupled to the motor, is stretched between a pair of anchor points disposed in the player such that the cord extends along a path substantially parallel to the direction of translation of the carriage. The motor translates the carriage in either direction when energized. The carriage is subject to motion independent of the drive motor when the cord is slackened.

According to another feature of the instant invention, one end of the drive cord is secured to a function lever disposed in the player. When the function lever is moved in a first direction, the drive cord is slackened to allow the caddy to restore the carriage to the starting position, without substantial hindrance from the carriage-mounted motor, when the caddy is inserted into the player for record retrieval. The function lever also serves to raise and lower the turntable to effect the transfer of a retained disc between the turntable and the receiving pads.

In accordance with a further feature of this invention, a selectively-actuated carriage drive motor, coupled to an output shaft, is fixedly mounted to the player housing. A cord, having a portion wrapped around the output shaft, is tied between a pair of anchor points disposed on the carriage such that the cord extends along a path substantially parallel to the direction of translation of the carriage. The motor, upon actuation, drives the carriage in either direction.

Figure 1:
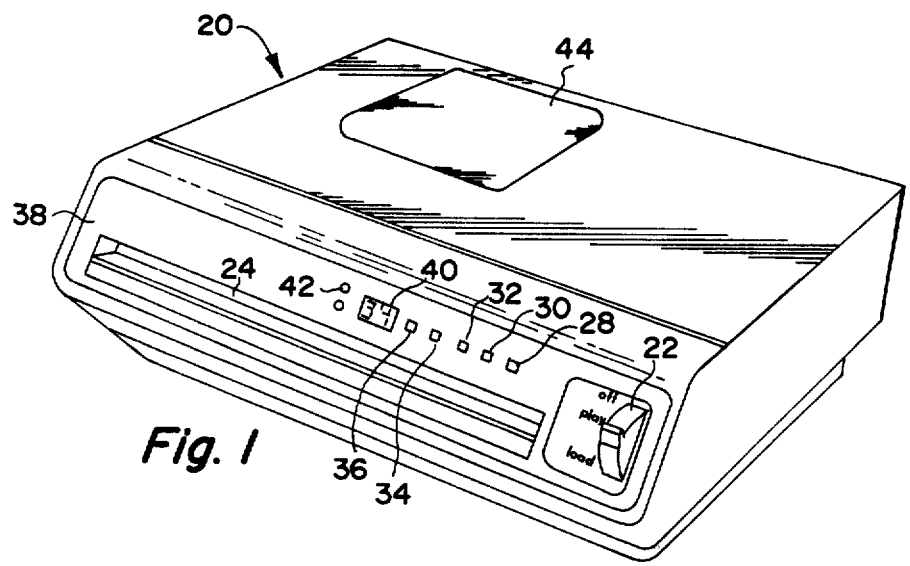
FIG. 1 is a video disc player incorporating a carriage drive mechanism in accordance with the instant invention.

Shown in FIG. 1 is a video disc player 20 incorporating the present carriage drive mechanism. A function lever 22 on the front side of the player is subject to disposition in any one of three positions—OFF, PLAY and LOAD/UNLOAD. A caddy entry door closes a caddy input slot 24 when the function lever 22 is disposed in the OFF and PLAY positions. In the LOAD/UNLOAD position of the function lever 22, the caddy entry door is opened to permit insertion of a full video disc caddy 26, shown in FIG. 2, into the player to load an enclosed record therein. A pushbutton 28 is provided to dispose the player in the "PAUSE" mode to allow the viewer to interrupt the program for as long as desired without missing any of the program content. In the PAUSE mode, the pickup device is raised and its lateral motion is arrested. A set of pushbuttons 30, 32, 34 and 36 are arranged on the instrument panel 38 to dispose the player in any one of four "SEARCH" modes, i.e., rapid access (forward/reverse) and visual search (forward/reverse), to permit the viewer to quickly locate a precise section of the prerecorded program. During rapid access, the pickup device is lifted, and rapidly moved sideways. In visual search, the pickup device is rapidly moved sideways while in engagement with the record to permit live search. A digital LED readout 40 provides an indication of playing time and other functions, such as PAUSE, LOAD/UNLOAD and END-OF-PLAY, etc. A pair of tally lights 42 are operated to provide an indication of the record side subject to play, e.g., "SIDE 1" and "SIDE 2". A removable door 44 is disposed on the cover of the player to provide access to a stylus cartridge 46, shown in FIG. 3, so that it can be changed when required.

Figure 2:
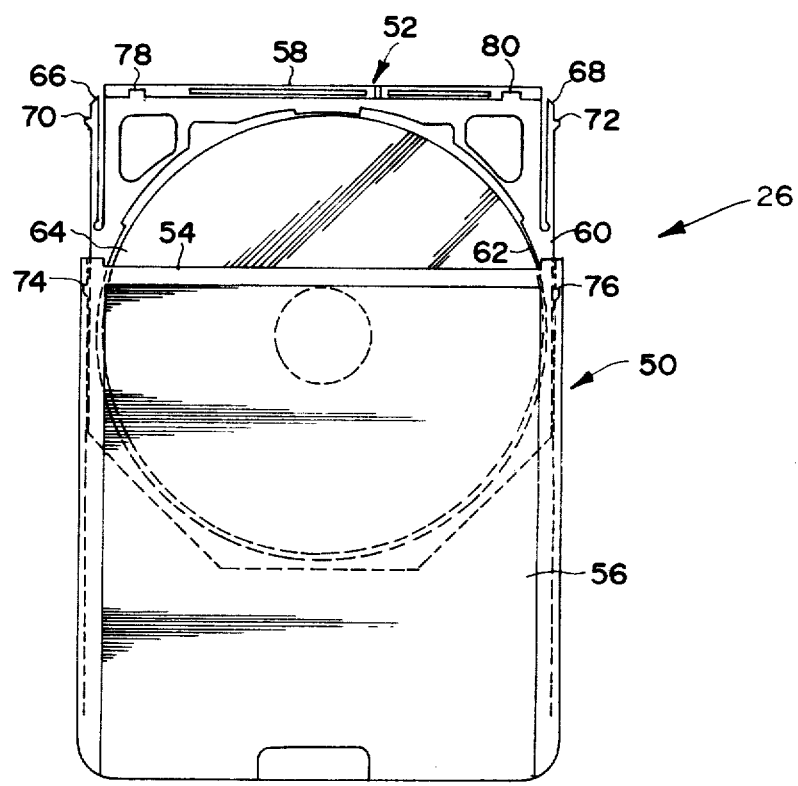
FIG. 2 shows a video disc caddy suitable for use with the player of FIG. 1.

As shown in FIG. 2, the video disc caddy 26 comprises a jacket 50 and a record retaining spine 52. The jacket 50 has an edge opening 54 in communication with a cavity 56 for enclosing a record/spine assembly. The spine 52 has a portion 58 which serves as a closure, and a further portion 60 having a circular opening 62 for receiving a centrally-apertured, spirally-grooved record 64. The spine 52 is further fitted with integrally-molded, flexural latch fingers 66 and 68. Each of the spine latch fingers 66 and 68 has a protruding element 70 and 72. The protruding elements 70 and 72 are received in pockets 74 and 76 disposed in the jacket 50 for capturing the spine 52 when it is fully seated therein. The spine 52 is provided with cutouts 78 and 80 for selectively receiving a pair of spine gripper members mounted in the player to secure the spine thereto in the manner explained later.

Figure 3:
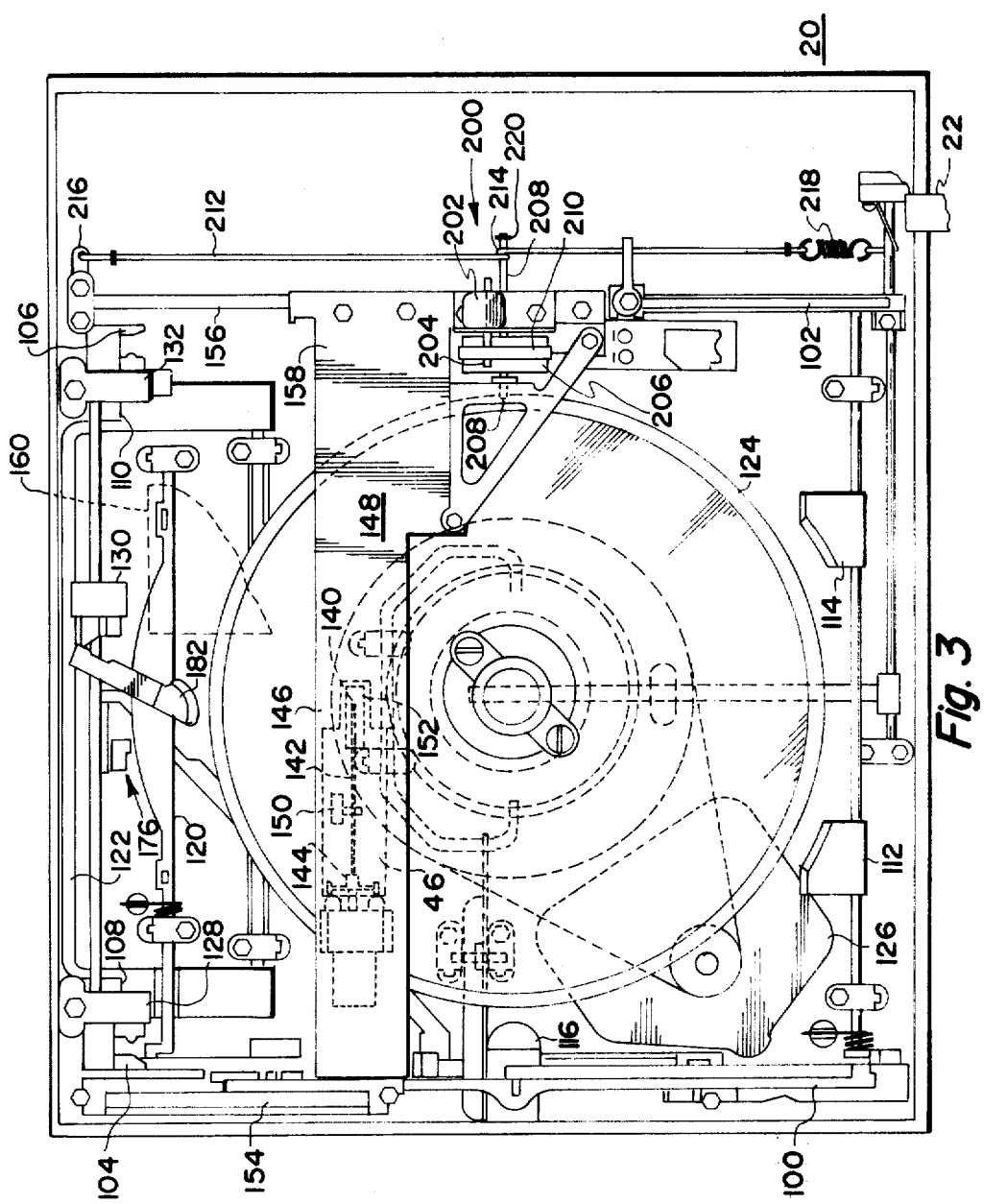
FIG. 3 represents a plan view of the player of FIG. 1 with its cover removed to show the details of the present carriage drive mechanism.

The operation of a record loading/unloading mechanism provided in the player will first be explained in conjunction with FIG. 3. To insert a record into the player, a loaded caddy 26 is guided into the input slot 24 along a path defined by side rails 100 and 102. As the caddy arrives at a fully inserted position in the player, latch defeat members 104 and 106 enter the jacket 50 to defeat the spine latch fingers 66 and 68, thereby freeing the spine 52 from the jacket. Pivotally mounted in the player are spine gripper members 108 and 110 which are received in the respective cutouts 78 and 80, arranged in the spine 52, when the caddy arrives at the fully inserted position in the player in order to lock the spine to the player. Since the spine 52 is released from the jacket 50 through the operation of the latch defeat members 104 and 106 and is latched to the player through the operation of the spine gripper members 108 and 110, subsequent withdrawal of the jacket leaves the record/spine assembly in the player. The retained record/spine assembly is supported on a set of depressible receiving pads 112, 114, 116, 118 (not shown) and 120. A pair of springs (not shown) disposed between a gripper arm 122, which carries the spine gripper members 108 and 110, and the latch defeat members 104 and 106 effect downward deflection of the latch defeat members upon jacket withdrawal.

To transfer the retained record to a turntable 124, the function lever 22 is displaced to the PLAY position, which, in turn, raises the turntable and starts a turntable motor 126. A set of hold-down members 128, 130 and 132 hold the retained spine 52 in place against the receiving pads 112, 114, 116, 118 and 120 while permitting the retained record to be intercepted by the turntable 124 when it is raised. The hold-down members 128, 130 and 132 also serve to accurately locate the retained spine 52, longitudinally and laterally, in the player.

A pickup stylus 140 is disposed at one end of a stylus arm 142, the other end of which is suspended in the cartridge 46 by means of a flexible rubber coupler 144. The cartridge 46 is placed in a compartment 146 provided in a stylus arm carriage 148. A stylus arm lifter 150 is mounted in the carriage 148 to selectively lower the pickup stylus 140 through an opening 152 provided in the bottom wall of the carriage to effect record engagement. During playback, a carriage drive mechanism 200, pursuant to the instant invention, drives the carriage 148 on guide ways 154 and 156 disposed parallel to the caddy side rails 100 and 102 from a starting position at the back of the player toward the front of the player in synchronism with the radially inward motion of the groove-guided pickup stylus 140. The operation of the subject carriage drive mechanism 200 will be explained in detail subsequently.

During playback, the variations in electrical capacitance between an electrode carried by the stylus 140 and a conductive property of the record 64, in correspondence to the rises and falls of the disc surface under the stylus end, are sensed by pickup circuitry 158 to reproduce the stored information on the record. The recovered signals are processed by signal processing circuits 160 to reconstruct a television signal containing picture and sound information for application to a television receiver.

To transfer the record back to the receiving pads 112, 114, 116, 118 and 120 after playback, the function lever 22 is depressed to the LOAD/UNLOAD position, which, in turn, lowers the turntable 124 to a level below the receiving pads. When the turntable 124 is lowered, the record is deposited on the receiving pads 112, 114, 116, 118 and 120 for reception in the opening 62 disposed in the spine 52 to redefine the record/spine assembly. The turntable motor 126 is shut off when the function lever 22 is displaced to the LOAD/UNLOAD position. The location of the receiving pads 112, 114, 116, 118 and 120, occupying the raised position thereof, is such that the record/spine assembly is aligned with the center line of the caddy side rails 100 and 102.

To retrieve the record/spine assembly, the empty jacket 50 is inserted into the player through the input slot 24 along the caddy side rails 100 and 102. As the jacket 50 is driven into the player, the front edge thereof engages the carriage 148 to push it back to a preset travel limit stop defining the starting position, and it also engages the already deflected latch defeat members 104 and 106 to cause further downward deflection thereof. Such further downward deflection of the latch defeat members 104 and 106, in turn, effects downward displacement of the spine gripping members 108 and 110, whereby the spine 52 is freed from the player. When the jacket 50 is fully inserted into the player, the protruding elements 70 and 72 of the spine latch fingers 66 and 68 snap back into the pockets 74 and 76 to lock the spine 52 to the jacket. The record/spine assembly is withdrawn from the player when the caddy is extracted.

Figure 4:
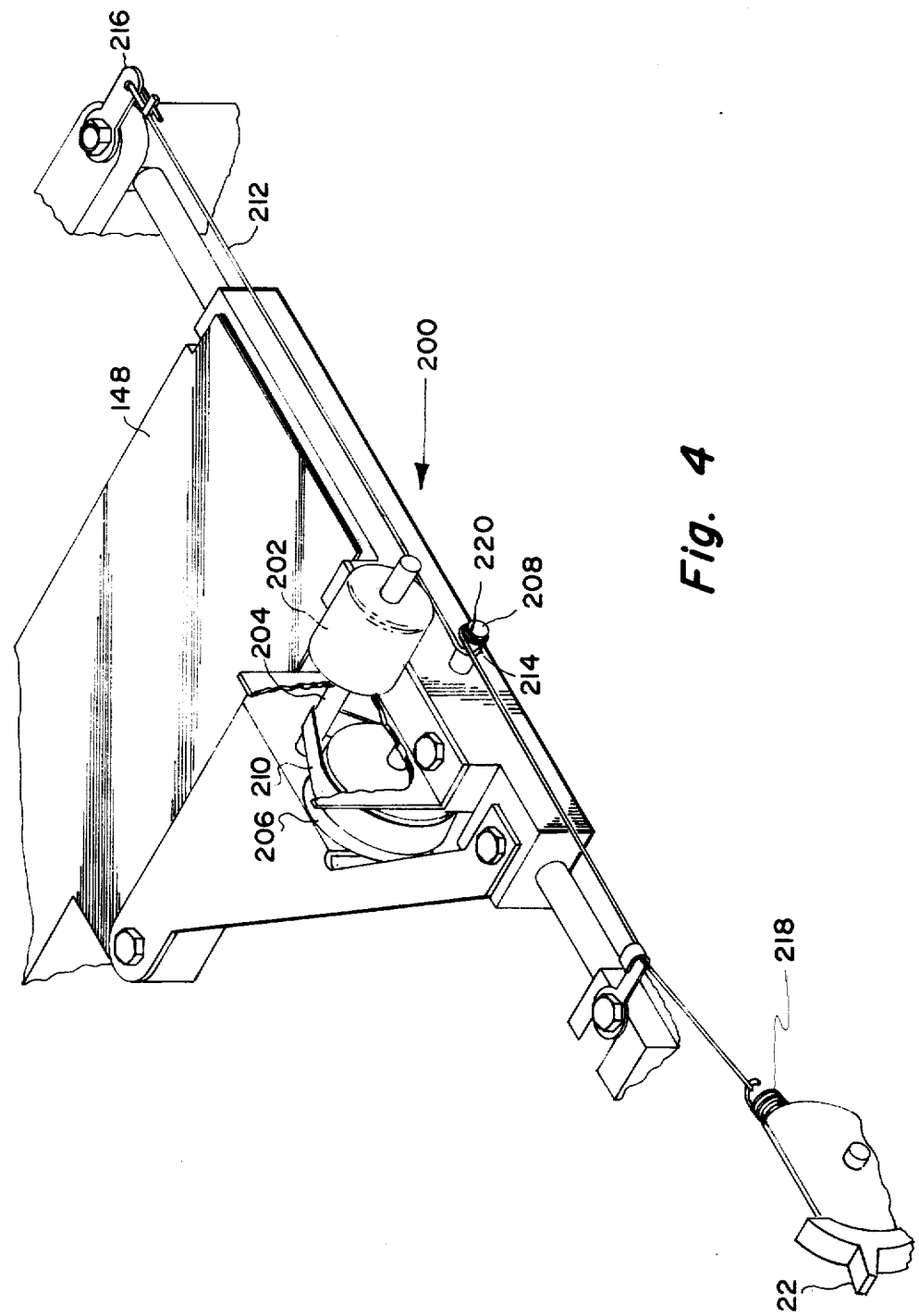
FIG. 4 illustrates a perspective view of the subject carriage drive mechanism of FIGS. 1 and 3.

The instant carriage drive mechanism 200 will now be described in conjunction with FIGS. 3 and 4. The carriage drive mechanism 200 includes a selectively-operated motor 202 mounted on the carriage 148. The motor output shaft 204 drives a pulley 206, rotatably mounted on a shaft 208, via a belt 210. A cable 212, having a portion 214 wrapped around the pulley shaft 208, has one end secured to a pin 216 fixedly mounted in the player. The other end of the cable 212 is attached to the function lever 22. A coil spring 218 is interposed between the two ends of the cable 212 to provide tension therein. A flange 220 is disposed on the pulley shaft 208 to retain the cable 212 thereon. When the function lever 22 is moved from the PLAY position to the LOAD/UNLOAD position, the tension in the cable 212, and thereby the wrap tension around the output shaft 208, is reduced to a point where the carriage 148 can move independently of the drive motor 202 and the pulley 206. The reduction in the cable tension facilitates restoration of the carriage 148 to the starting position thereof when an empty caddy is inserted into the player for record retrieval. The motion of the function lever 22 from the LOAD/UNLOAD position to the PLAY position increases the tension in the cable 212 to a level where the motor 202 drives the carriage 148 upon actuation. The rotational speed of the motor 202 and the dimensions of the various parts are such that the rate of advancement of the carriage 148 substantially corresponds to the radial motion of the groove-guided stylus 140.

Figure 5:
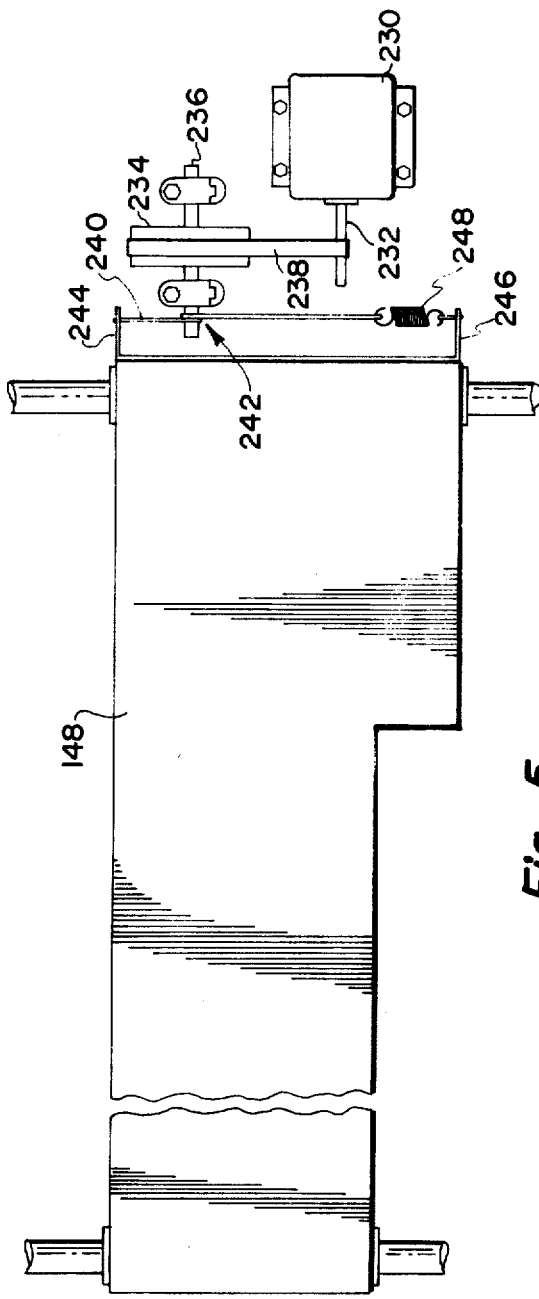
FIG. 5 depicts another embodiment of the carriage drive mechanism according to this invention.

FIG. 5 illustrates another embodiment of the instant invention. In the FIG. 5 embodiment, a selectively-energized carriage drive motor 230, having an output shaft 232, is mounted to the player chassis. The motor output shaft 232 drives a pulley 234, rotatably mounted on a shaft 236, by means of a belt 238. A cord 240, having a wrapped-around turn 242 disposed about the pulley shaft 236, is stretched between two anchor points 244 and 246 fixedly disposed on the carriage 148. A coil spring 248 is inserted in series with the cord 240 to provide the required tension therein. The motor 230, when operated, drives the carriage 148 at an appropriate speed so that it follows the radial motion of the mechanically-guided stylus 140.

In these embodiments, the cable comprises a 0.035 inch diameter cord having braided nylon sheath with a 3-strand fiberglass "rope" core, available from GC Electronics of Rockford, Ill. The drive motor, used in the embodiments described herein, is a stepper motor manufactured by Copal Electronics of Tokyo, Japan, Model No. SP2B-418-60.

Figure 6:
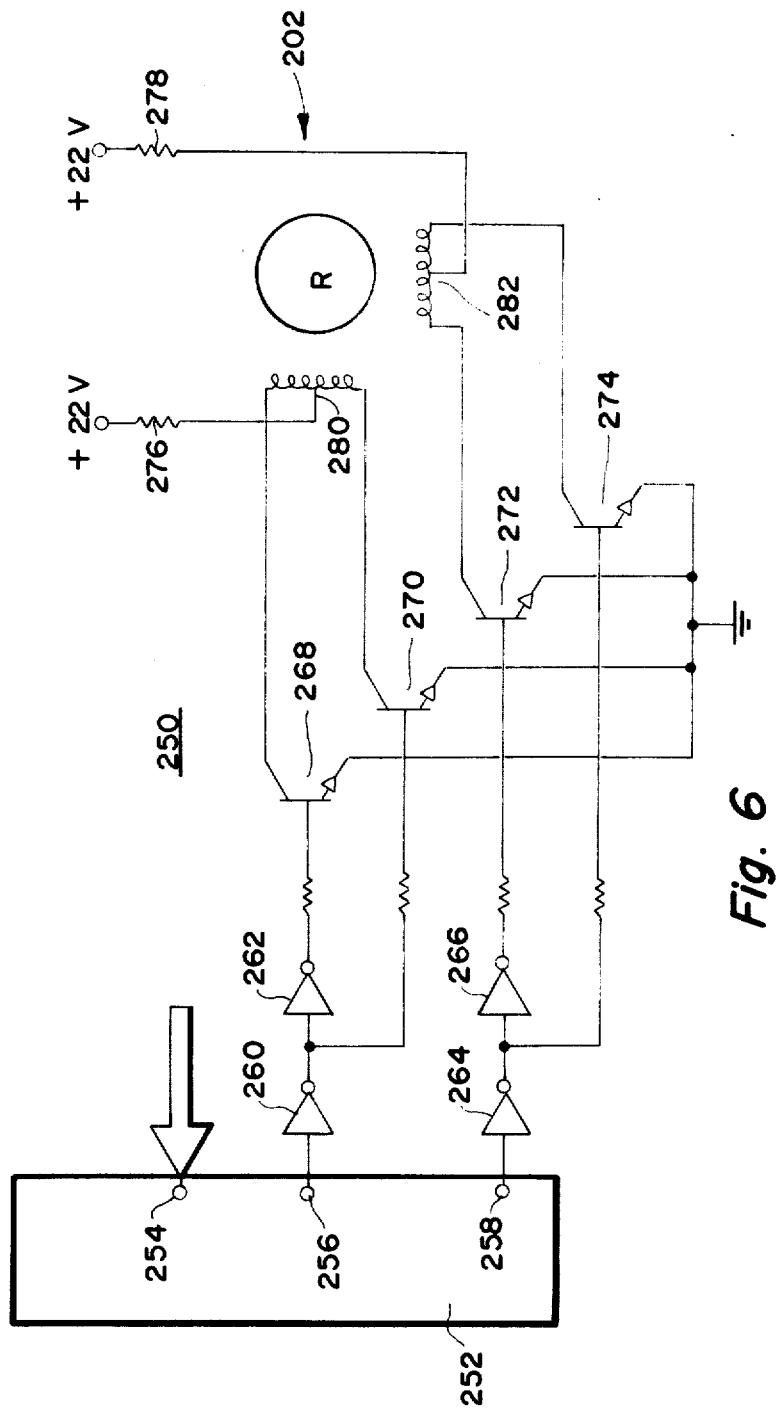
FIG. 6 shows a schematic of the motor drive circuit suitable for use with the instant invention.

FIG. 6 depicts a motor drive circuit 250 suitable for use with this invention. A microprocessor 252, responsive to a stylus position error signal at an input terminal 254, generates the proper motor control signals at output terminals 256 and 258 thereof. Refer to U.S. patent application Ser. No. 055,976, for an example of an apparatus for generating a stylus position error signal. The two microprocessor outputs drive a set of four buffer/inverters 260, 262, 264 and 266 to produce the necessary step sequence signals. To safely sink the motor drive current, a set of four transistors 268, 270, 272 and 274 are utilized, as shown, in the final stage of the drive circuit. A +22 Volt DC supply is connected through two resistors 276 and 278 to the two motor coil common taps 280 and 282. For further circuit details, refer to the Stepper Motor Handbook published by North American Philips Controls Corporation of Cheshire, Conn.

What is claimed is:

1. In a disc record player for playing back prerecorded information from a rotatable disc record by means of a signal pickup housed in a carriage, when pickup/record relative motion is established; said carriage being subject to translation radially of said disc record during playback; a carriage drive apparatus comprising:

(A) a selectively-energized carriage drive motor mounted to said carriage, and coupled to an output shaft;

(B) a cord having a portion wrapped around said output shaft, and having its ends stretched between a pair of anchor points in said player such that said cord extends along a path substantially parallel to the direction of translation of said carriage; said drive motor causing said carriage translation when energized; and (C) selectively-operated means for slackening said cord to reduce the tension therein to allow motion of said carriage substantially independent of said motor.

2. Carriage drive apparatus as defined in claim 1 wherein said selectively-operated slackening means comprises an actuating lever movably-mounted in said player; wherein one end of said cord is secured to said actuating lever for motion therewith; wherein motion of said actuating lever in a given direction causes relaxation of said cord to release said carriage for motion without substantial hindrance by said motor; wherein motion of said actuating lever in an opposite direction places said cord under tension to effect said carriage translation when said motor is activated.

3. Carriage drive apparatus as defined in claim 2 further including a coil spring interposed between said ends of said cord to provide said tension therein.

4. Carriage drive apparatus as defined in claim 2 wherein said anchor points are offset with respect to each other to reduce the friction between successive turns of said cord wrapped around said output shaft.

5. In a disc record player for playing back prerecorded information from a rotatable disc record by means of a signal pickup housed in a carriage, when pickup/record relative motion is established; said carriage being subject to translation radially of said disc record during playback; a carriage drive apparatus comprising:

(A) a carriage drive motor mounted to said carriage and coupled to an output shaft;

(B) an actuating lever movably-mounted in said player; and (C) a cord having a portion wrapped around said output shaft; said cord having one end secured to a fixed point in said player, and having the other end secured to said actuating lever; motion of said actuating lever in a first direction serving to place said cord under tension to cause said translation of said carriage radially of said record when said motor is energized; motion of said actuating lever in a second direction loosening said cord disposed around said output shaft to permit motion of said carriage without substantial hindrance by said motor.

* * * * *